(12) United States Patent
Resendes et al.

(10) Patent No.: US 7,015,265 B2
(45) Date of Patent: Mar. 21, 2006

(54) FILLED ELASTOMERIC BUTYL COMPOUNDS WITH IMPROVED SCORCH SAFETY

(75) Inventors: Rui Resendes, Sarnia (CA); William Hopkins, Sarnia (CA)

(73) Assignee: Bayer Inc., Sarnia (CA)

( * ) Notice: Subject to any disclaimer, the term of this patent is extended or adjusted under 35 U.S.C. 154(b) by 253 days.

(21) Appl. No.: 10/301,167

(22) Filed: Nov. 21, 2002

(65) Prior Publication Data
US 2003/0119967 A1    Jun. 26, 2003

(30) Foreign Application Priority Data
Nov. 27, 2001 (CA) ................................ 2364174

(51) Int. Cl.
*C08K 5/05* (2006.01)
*C08K 3/04* (2006.01)
*C08K 3/10* (2006.01)
*C08K 3/16* (2006.01)

(52) U.S. Cl. ........................ 524/381; 524/435; 524/492; 524/493; 524/495; 524/496; 525/334.1

(58) Field of Classification Search ................ 524/492, 524/493, 495, 496, 435, 381; 525/334.1
See application file for complete search history.

(56) References Cited

U.S. PATENT DOCUMENTS 4,202,952 A * 5/1980 Onizawa ................. 525/184
5,428,099 A * 6/1995 Morrar et al. .......... 524/495

FOREIGN PATENT DOCUMENTS

| CA | 2293149 | 6/2001 |
|----|---------|--------|
| CA | 2 339 080 | 9/2002 |
| EP | 0 857 761 A1 * | 8/1998 |

* cited by examiner

*Primary Examiner*—Tae H. Yoon
(74) *Attorney, Agent, or Firm*—Jennifer R. Seng

(57) ABSTRACT

The present invention provides a process for preparing a filled halobutyl elastomer, which includes mixing a halobutyl elastomer, particles of filler an additive containing both amino and alcohol functional groups, and one or more hydrated metal halogens and optional curing the filled elastomer with sulfur or other curative systems. The compositions of the present invention have improved properties when compared to known carbon black-filled halobutyl elastomeric compositions combined with an enhanced scorch safety. This present invention has the advantages of (a) not evolving alcohol either during the manufacture or subsequent use of the article manufactured from the compound, and (b) maintaining good processability of the compound.

11 Claims, 3 Drawing Sheets

FILLED ELASTOMERIC BUTYL COMPOUNDS WITH IMPROVED SCORCH SAFETY

FIELD OF THE INVENTION

The present invention relates to halogenated butyl elastomers with improved scorch safety. Further, the present invention also relates to bromobutyl elastomers with improved scorch safety.

BACKGROUND OF THE INVENTION

It is known that reinforcing fillers, such as carbon black and silica greatly improve the strength and fatigue properties of elastomeric compounds. It is also known that chemical interaction occurs between the elastomer and the filler. For example, good interaction between carbon black and highly unsaturated elastomers, such as polybutadiene (BR) and styrene butadiene copolymers (SBR) occurs due to the large number of carbon-carbon double bonds present in these copolymers. Butyl elastomers may have only one tenth, or fewer, of the carbon-carbon double bonds found in BR or SBR, and compounds made from butyl elastomers are known to interact poorly with carbon black. For example, a compound prepared by mixing carbon black with a combination of BR and butyl elastomers results in domains of BR, which contain most of the carbon black, and butyl domains which contain very little carbon black. It is also known that butyl compounds have poor abrasion resistance.

Canadian Patent Application 2,293,149 discloses that it is possible to produce filled butyl elastomer compositions with improved properties by combining halobutyl elastomers with silica and specific silanes. These silanes act as dispersing and bonding agents between the halogenated butyl elastomer and the filler. However, one disadvantage of the use of silanes is the evolution of alcohol during the process of manufacture and potentially during the use of the manufactured article produced by this process. Additionally, silanes significantly increase the cost of the resulting manufactured article.

Co-pending Canadian Patent Application 2,339,080 discloses a process for preparing compositions containing halobutyl elastomers and organic compounds containing at least one basic nitrogen-containing group and at least one hydroxyl group, in which there is enhanced interaction between the elastomer and a filler, especially a mineral filler. Of interest were compounds containing primary amine and hydroxyl groups such as ethanolamine. While solving the problem of enhancing the interaction between elastomer and filler, the compositions have to be processed carefully to prevent any undesirable scorch of the composition. Those skilled in the art understand the term "scorch" to mean premature crosslinking of the composition during processing.

SUMMARY OF THE INVENTION

The present invention provides a process for preparing compositions containing halobutyl elastomers, organic compounds containing at least one basic nitrogen-containing group and at least one hydroxyl group, and hydrated metal halogens. During the process there is enhanced interaction between the elastomer and a filler, preferably a mineral filler with improved scorch safety. The invention also provides filled halobutyl elastomer compositions containing halobutyl elastomers, organic compounds containing at least one basic nitrogen-containing group and at least one hydroxyl group, and one or more hydrated metal halogens. Compositions according to the present invention have improved properties when compared to known carbon black-filled halobutyl elastomeric compositions combined with an enhanced scorch safety. The present invention provides a means to produce such filled compositions without the evolution of alcohol.

Preferred organic compounds containing at least one basic nitrogen-containing group and at least one hydroxyl group containing primary amine and hydroxyl groups, such as ethanolamine. Organic compounds are believed to disperse and bond the silica to the halogenated elastomers.

Accordingly, the present invention provides a process which includes mixing a halobutyl elastomer with a filler, such as a mineral filler, in the presence of an additive which is an organic compound which has at least one hydroxyl group and at least one basic nitrogen-containing group and one or more hydrated metal halogens, and curing the resulting filled halobutyl elastomer. The resulting composition has improved scorch safety.

The halobutyl elastomer that is admixed with the filler and one or more organic compounds which have at least one hydroxyl group and at least one basic nitrogen-containing group and one or more hydrated metal halogens may be a mixture with another elastomer or elastomeric compound. The halobutyl elastomer should constitute more than 5% of any such mixture. Preferably, the halobutyl elastomer should constitute at least 10% of any such mixture. In some cases it is preferred not to use mixtures but to use the halobutyl elastomer as the sole elastomer. If mixtures are to be used, the other elastomer may be, for example, natural rubber, polybutadiene, styrene-butadiene or poly-chloroprene or an elastomer compound containing one or more of these elastomers.

The filled halobutyl elastomer can be cured to obtain a product, which has improved properties, for instance in abrasion resistance, rolling resistance and traction. Curing can be effected with sulfur. The preferred amount of sulfur is form 0.3 to 2.0 parts by weight per hundred parts of rubber. An activator, for example zinc oxide, may also be used, in an amount of from 5 parts to 2 parts by weight. Other ingredients, for instance stearic acid, antioxidants, or accelerators may also be added to the elastomer prior to curing. Sulphur curing is then effected in a known manner. See, for instance, chapter 2, "The Compounding and Vulcanization of Rubber", of "Rubber Technology", $3^{rd}$ edition, published by Chapman & Hall, 1995, the disclosure of which is incorporated by reference.

Other curatives known to cure halobutyl elastomers may also be used. A number of compounds are known to cure BIIR, such as bis dieneophiles (for example HVA2=m-phenylene-bis-maleimide) phenolic resins, amines, amino acids, peroxides, zinc oxide and the like. Combinations of the aforementioned curatives may also be used.

The mineral-filled halobutyl elastomer of the present invention can be admixed with other elastomers or elastomeric compounds before it is subjected to the curing with sulphur.

DETAILED DESCRIPTION OF THE INVENTION

Figure 1:
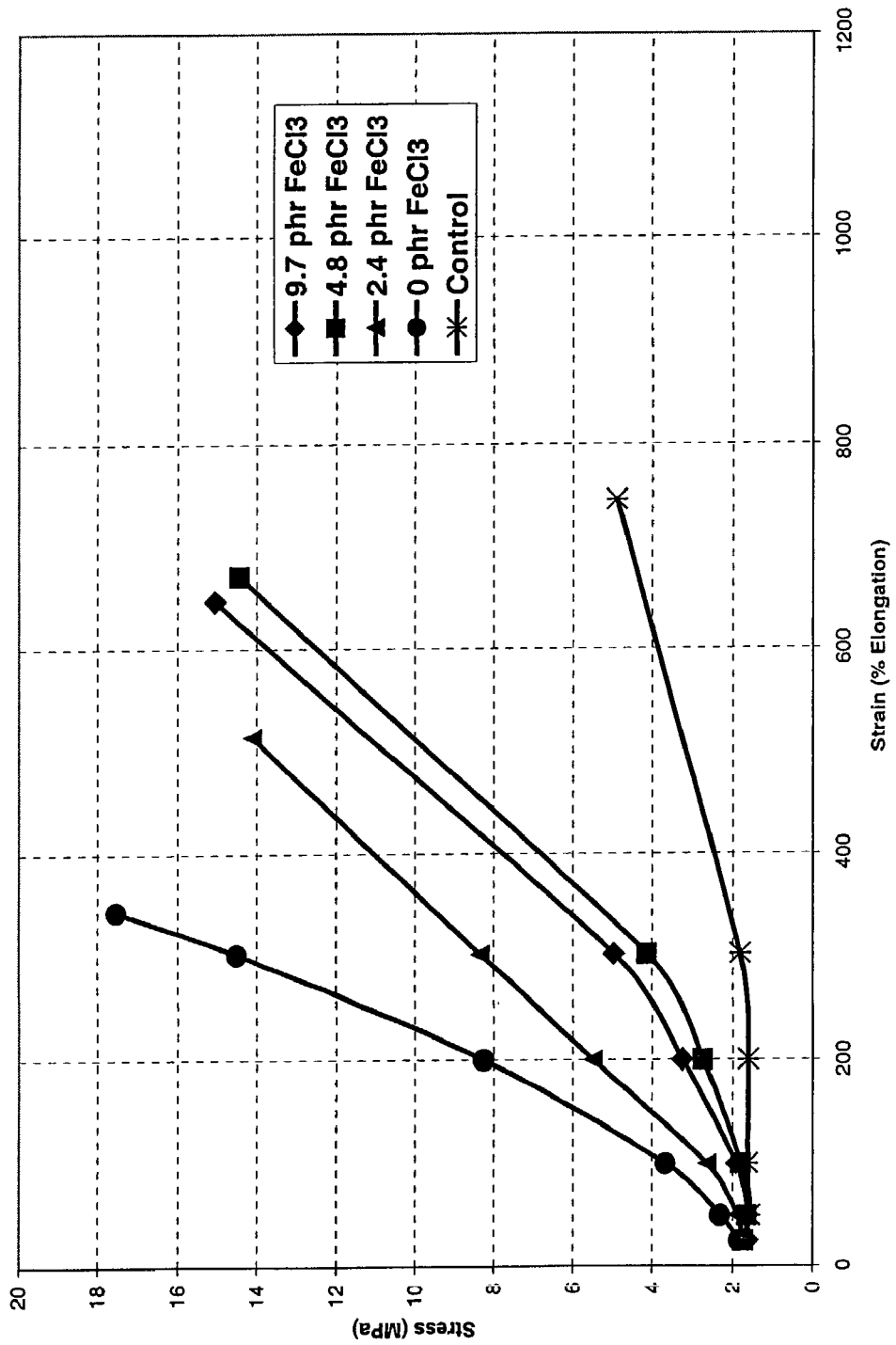
FIG. 1 illustrates the stress strain profile for $FeCl_3.xH_2O$ and ethanolamine containing compounds.

The phrase "halobutyl elastomer(s)" as used herein refers to a chlorinated or brominated butyl elastomer. Brominated butyl elastomers are preferred, and the present invention is illustrated, by way of example, with reference to such bromobutyl elastomers. It should be understood, however, that the invention extends to the use of chlorinated butyl elastomers.

Thus, halobutyl elastomers suitable for use in the practice of this invention include, but are not limited to, brominated butyl elastomers. Such elastomers may be obtained by bromination of butyl rubber (which is a copolymer of isobutylene and a co-monomer that is usually a $C_4$ to $C_6$ conjugated diolefin, preferably isoprene). Co-monomers other than conjugated diolefins can be used, for example alkyl-substituted vinyl aromatic co-monomers such as $C_1$–$C_4$-alkyl substituted styrene. An example of such an elastomer which is commercially available is brominated isobutylene methylstyrene copolymer (BIMS) in which the co-monomer is p-methylstyrene.

Brominated butyl elastomer typically contains from 1 to 3 weight percent of isoprene and from 97 to 99 weight percent of isobutylene (based upon the hydrocarbon content of the polymer) and from 1 to 4 weight percent bromine (based upon the bromobutyl polymer). A typical bromobutyl polymer has a molecular weight, expressed as the Mooney viscosity (ML 1+8 at 125° C.), of from 28 to 55.

For use in the present invention the brominated butyl elastomer preferably contains in the range of from 1 to 5 weight percent of isoprene and from 95 to 99 weight percent of isobutylene, based upon the hydrocarbon content of the polymer and from 0.5 to 2.5 weight percent, preferably from 0.75 to 2.3 weight percent, of bromine, based upon the brominated butyl polymer.

A stabilizer may be added to the brominated butyl elastomer. Suitable stabilizers include calcium stearate and epoxidized soy bean oil, preferably used in an amount in the range of from 0.5 to 5 parts by weight per 100 parts by weight of the brominated butyl rubber.

Examples of suitable brominated butyl elastomers Bayer Bromobutyl 2030, Bayer Bromobutyl 2040 (BB2040), Bayer Bromobutyl X2 commercially available from Bayer Inc. BB2040 has a Mooney viscosity (RPML 1+8@ 125° C. according to ASTM D 52-89) of 39±4, a bromine content of 2.0±0.3 wt % and an approximate molecular weight Mw of 500,000 grams per mole.

The brominated butyl elastomer used in the process of the present invention may also be a graft copolymer of a brominated butyl rubber and a polymer based upon a conjugated diolefin monomer. Co-pending Canadian Patent Application 2,279,085 is directed towards a process for preparing such graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The disclosure of this application is incorporated herein by reference. The bromobutyl elastomer of the graft copolymer can be any of those described above. The conjugated diolefins that can be incorporated in the graft copolymer generally have the structural formula:

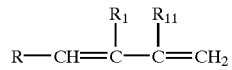

wherein R is a hydrogen atom or an alkyl group containing from 1 to 8 carbon atoms and wherein $R_1$ and $R_{11}$ can be the same or different and are selected from hydrogen atoms and alkyl groups containing from 1 to 4 carbon atoms. Some representative non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing from 4 to 8 carbon atoms are preferred, 1,3-butadiene and isoprene being more preferred.

The polymer based on a conjugated diene monomer can be a homopolymer, or a copolymer of two or more conjugated diene monomers, or a copolymer with a vinyl aromatic monomer.

The vinyl aromatic monomers, which can optionally be used, are selected so as to be copolymerizable with the conjugated diolefin monomers being employed. Generally, any vinyl aromatic monomer, which is known to polymerize with organo-alkali metal initiators, can be used. Such vinyl aromatic monomers usually contain from 8 to 20 carbon atoms, preferably from 8 to 14 carbon atoms. Some examples of vinyl aromatic monomers which can be so copolymerized include styrene, alpha-methyl styrene, various alkyl styrenes including p-methylstyrene, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene.

The filler is composed of particles of a mineral, and examples include silica, silicates, clay (such as bentonite), gypsum, alumina, aluminum oxide, magnesium oxide, calcium oxide, titanium dioxide, talc and the like, as well as mixtures thereof. These mineral particles have hydroxyl groups on their surface, rendering them hydrophilic and oleophobic, which increases the difficulty of achieving good interaction between the filler particles and the butyl elastomer. For many purposes, the preferred mineral is silica, especially silica prepared by the carbon dioxide precipitation of sodium silicate.

Dried amorphous silica particles suitable for use in accordance with the present invention have a mean agglomerate particle size between 1 and 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are available under the trademarks Hi-Sil® 210, Hi-Sil® 233 and Hi-Sil® 243 from PPG Industries Inc. Also suitable are Vulkasil S and Vulkasil N, commercially available from Bayer AG.

Carbon black is not necessarily used as a filler in the halobutyl elastomer compositions of the present invention, but in some embodiments it may be present in an amount up to 40 phr. If the mineral filler is silica and it is used with carbon black, the silica should constitute at least 55% by weight of the total of silica and carbon black. If the halobutyl elastomer composition of the present invention is blended with another elastomeric composition, the elastomeric composition may contain carbon black as a filler.

The amount of filler to be incorporated into the halobutyl elastomer can vary between wide limits. Typical amounts of filler range from 20 parts to 120 parts by weight, preferably from 30 parts to 100 parts, more preferably from 40 to 80 parts per hundred parts of elastomer.

The organic compound which has at least one hydroxyl group and at least one basic nitrogen-containing group contains at least one hydroxyl group, which (without being bound to any particular theory) may react with the mineral filler, and at least one group containing a basic nitrogen atom, which (without being similarly bound) may react with the active halogen in a halogenated butyl elastomer (for example with the active bromine atom in a brominated butyl elastomer). Functional groups containing —OH may be, for example, alcohols or carboxylic acids. Functional groups containing a basic nitrogen atom include, but are not limited to, amines (which can be primary, secondary or tertiary) and amides. Preferred are primary alkyl amine groups such as aminoethyl, aminopropyl and the like.

Examples of organic compound which has at least one hydroxyl group and at least one basic nitrogen-containing group which give enhanced physical properties to mixtures of halobutyl elastomers and silica include proteins, aspartic acid, 6-aminocaproic acid, diethanolamine and triethanolamine. Preferably, the additive should contain a primary alcohol group and a primary amino group separated by methylene bridges, which may be branched. Such compounds have the general formula HO—A—$NH_2$; wherein A represents a $C_1$ to $C_{20}$ alkylene group, which may be linear or branched.

More preferably, the number of methylene groups between the two functional groups should be between 1 and 4. Examples of preferred additives include mono-ethanolamine and 3-amino-1-propanol.

The amount of the organic compound which has at least one hydroxyl group and at least one basic nitrogen-containing group used is dependent upon the molecular/equivalent weight of each specific compound. One important factor is the number/weight of nitrogen per unit weight of the compound. The level of nitrogen may range from 0.1 to 5 parts per hundred (phr) of halobutyl rubber, preferably from 0.125 to 1 phr and, more preferably, from 0.3 to 0.7 phr. Up to 40 parts of processing oil, preferably from 5 to 20 parts, per hundred parts of elastomer, may be present. Further, a lubricant, for example a fatty acid such as stearic acid, may be present in an amount up to 3 parts by weight, more preferably in an amount up to 2 parts by weight.

The hydrated metal halogen will have the general formula $MX_n$ (m$H_2$O), in which M denotes for a metal selected from groups 1–16 of the periodic system of the element according to IUPAC 1985, X is selected from the group consisting of fluorine, chlorine, bromine and iodine and mixtures thereof, n is the number of halogens needed to compensate the positive charge of the metal ion and m is the average number of water molecules which typically surround the positively charged metal ion. The value m is typically determined through X-ray structural analysis or through various gravimetric techniques typically used by those skilled in the art.

Preferred metals are selected from the groups 3 to 12 according to IUPAC and include Cr, Ni, Co and Fe.

Preferred halogens include chlorine and bromine.

The metal halogens are usually added in an amount of from 0.1 to 20 phr, preferably of from 2 to 10.

The metal halogens are especially useful in improving the scorch safety of compounds containing primary aminoalcohols.

The halobutyl elastomer, filler and additives are mixed together, suitably at a temperature in the range of from 25 to 200° C. It is preferred that the temperature in one of the mixing stages be greater than 60° C., and a temperature in the range of from 90 to 150° C. is particularly preferred. Normally the mixing time does not exceed one hour; a time in the range from 2 to 30 minutes is usually adequate. The mixing is suitably carried out on a two-roll mill mixer, which provides good dispersion of the filler within the elastomer. Mixing may also be carried out in a Banbury mixer, or in a Haake or Brabender miniature internal mixer. An extruder also provides good mixing, and has the further advantage that it permits shorter mixing times. It is also possible to carry out the mixing in two or more stages. Further, the mixing can be carried out in different apparatuses, for example one stage may be carried out in an internal mixer and another in an extruder.

The order of addition of the different components to the rubber is not critical, however, it might be advantageous to mix the metal halogen(s), the filler(s) and the organic compound which has at least one hydroxyl group and at least one basic nitrogen-containing group contains at least one hydroxyl group prior to the addition of the rubber.

The enhanced interaction between the filler and the halobutyl elastomer results in improved properties for the filled elastomer. These improved properties include higher tensile strength, higher abrasion resistance, lower permeability and better dynamic properties. These render the filled elastomers suitable for a number of applications, including, but not limited to, use in tire treads and tire sidewalls, tire innerliners, tank linings, hoses, rollers, conveyor belts, curing bladders, gas masks, pharmaceutical enclosures and gaskets. These advantages are achieved together with an enhancement in scorch safety.

Preferably, bromobutyl elastomer, silica particles, organic compound which has at least one hydroxyl group and at least one basic nitrogen-containing group, one or more of the metal halogens and, optionally, processing oil extender are mixed on a two-roll mill at a nominal mill temperature of 25° C. The mixed compound is then placed on a two-roll mill and mixed at a temperature above 60° C. It is preferred that the temperature of the mixing is not too high, and more preferably does not exceed 150° C., since higher temperatures may cause curing to proceed undesirably far and thus impede subsequent processing. The product of mixing these ingredients at a temperature not exceeding 150° C. is a compound which has good stress/strain properties and which can be readily processed further on a warm mill with the addition of curatives.

The filled halobutyl rubber compositions of the present invention, and the filled bromobutyl rubber compositions of the present invention, find many uses, but mention is made of use in tire tread compositions. Important features of a tire tread composition are that it shall have low rolling resistance, good traction, particularly in the wet, and good abrasion resistance so that it is resistant to wear. Compositions of the present invention display improved resistance to wear when compared to compounds that contain no organic modifier or hydrated metal halogen while possessing improved scorch safety. As is demonstrated in the examples below, compositions of the invention display improved resistance to wear with enhanced scorch safety.

The filled halobutyl elastomers of this invention can be further mixed with other rubbers, for example natural rubber, butadiene rubber, styrene-butadiene rubber and isoprene rubbers, and compounds contain these elastomers.

The present invention is further illustrated in the following examples and the accompanying Figures.

EXAMPLES

Description of Tests

Abrasion resistance: DIN 53-516 (60 grit Emery paper)

Cure rheometry: ASTM D 52-89 MDR2000E Rheometer at 1° arc and 1.7 Hz

RPA analysis. 100° C. at a frequency of 30 cpm at strains of 0.5, 1, 2, 5, 10, 20, 50 and 90°.

Compound Mooney Scorch. Measurements were conducted at 135° C. using a small rotor. The $t_{03}$ value obtained with the small rotor is equivalent to the $t_{05}$ value (large rotor) typically quoted.

Stress-strain. Samples were prepared by curing a macro sheet at 170° C. for $t_{c90+5}$ minutes, after which the appropriate sample was dyed out. The test was conducted at 23° C.

Description of Ingredients and General Mixing Procedure:

Hi-Sil® 233—silica—a product of PPG

Sunpar® 2280—paraffinic oil produced by Sun Oil.

Maglite® D—magnesium oxide by C. P. Hall

The brominated butyl elastomer, silica, oil, bonding compound and hydrated metal halogen were mixed in a 1.57 liter Banbury internal tangential mixture with the Mokon set to 40° C. and a rotor speed of to 77 RPM. Curatives were then added to the cooled sample with a 6"×12" mill at 25° C.

Example 1

The effect of $FeCl_3.xH_2O$ on the degree of reinforcement (as denoted by the M300/M100 values), degree of silica dispersion, DIN abrasion resistance and scorch safety (as denoted by the $t_{03}$ times in minutes) in compounds containing brominated butyl rubber, Hi-Sil® 233, Maglite® D and ethanolamine was studied. A compound containing only brominated butyl rubber, Hi-Sil® 233 and Maglite® D was used as a control. All of the compounds studied utilized a mixture of 0.5 phr of sulfur, 1.5 phr of zinc oxide and 1.0 phr of stearic acid as the curative system.

The following levels of $FeCl_3.xH_2O$ were studied:
(i) 0 phr $FeCl_3.xH_2O$
(ii) 2.4 phr $FeCl_3.xH_2O$
(iii) 4.8 phr $FeCl_3.xH_2O$
(iv) 9.7 phr $FeCl_3.xH_2O$ All compounds, except for the control used 2.2 phr of ethanolamine as the organic additive containing at least one amino group and at least one hydroxyl group.

Brominated isoprene isobutylene rubber (BIIR) was mixed with the additive, 60 parts per hundred rubber (phr) of silica filler (Hi-Sil® 233) in a Banbury internal mixer under the mixing conditions described above. Identical curative ingredients (1 phr of stearic acid, 0.5 phr of sulfur, and 1.5 phr of ZnO) were then added on a cool mill to each of the compounds. The compounds were then cured for either $t_{c(90)}$+10 minutes at 170° C. (for DIN Abrasion testing) or $t_{c(90)}$+5 minutes at 170° C. and tested. Table 1 gives the product compositions, and physical property data for the $FeCl_3.xH_2O$ containing compounds and for a compound containing no filler bonding agent.

TABLE 1

| Example | 1a | 1b | 1c | 1d | 1e |
|---|---|---|---|---|---|
| Coupling Agent | 9.7 phr $FeCl_3$ | 4.8 phr $FeCl_3$ | 2.4 phr $FeCl_3$ | 0 phr $FeCl_3$ | Control |
| STRESS STRAIN (DUMBELLS) | | | | | |
| Cure Time (min) | 25 | 23 | 25 | 19 | 34 |
| Cure Temperature (° C.) | 170 | 170 | 170 | 170 | 170 |
| Dumbell | Die C | Die C | Die C | Die C | Die C |
| Test Temperature (° C.) | 23 | 23 | 23 | 23 | 23 |
| Hard. Shore A2 Inst. (pts.) | 74 | 76 | 75 | 72 | 76 |
| Ultimate Tensile (MPa) | 15.04 | 14.45 | 14.1 | 17.53 | 4.9 |
| Ultimate Elongation (%) | 646 | 671 | 515 | 343 | 746 |
| Strain (% Elongation) | 9.7 phr $FeCl_3$ | 4.8 phr $FeCl_3$ | 2.4 phr $FeCl_3$ | 0 phr $FeCl_3$ | Control |
| 25 | 1.62 | 1.72 | 1.78 | 1.83 | 1.74 |
| 50 | 1.62 | 1.65 | 1.88 | 2.31 | 1.57 |
| 100 | 1.9 | 1.8 | 2.64 | 3.67 | 1.62 |
| 200 | 3.26 | 2.74 | 5.48 | 8.24 | 1.6 |
| 300 | 4.97 | 4.15 | 8.34 | 14.5 | 1.81 |
|  | Stress (MPa) | Stress (MPa) | Stress (MPa) | Stress (MPa) | Stress (MPa) |
| 300/100 | 2.62 | 2.31 | 3.16 | 3.95 | 1.02 |
| DIN ABRASION | | | | | |
| Abrasion Volume Loss ($mm^3$) | 347 | 336 | 320 | 255 | TSTM |
| COMPOUND MOONEY SCORCH | | | | | |
| t Value $t_{03}$ (min) | 5.32 | 2.55 | 7.47 | 1.36 | >30 |
| MDR CURE CHARACTERISTICS | | | | | |
| MH (dN · m) | 32.52 | 36.43 | 38.32 | 41.58 | 27.05 |
| ML (dN · m) | 16.84 | 18.04 | 16.72 | 14.05 | 19.62 |
| Delta MH-ML (dN · m) | 15.68 | 18.39 | 21.6 | 27.53 | 7.43 |
| $t_{s1}$ (min) | 1.02 | 0.96 | 0.36 | 0.3 | 1.5 |
| $t_{s2}$ (min) | 1.56 | 1.32 | 0.54 | 0.42 | 3 |
| $t'_{10}$ (min) | 1.29 | 1.24 | 0.54 | 0.44 | 1.13 |
| $t'_{25}$ (min) | 2.66 | 2.26 | 1.2 | 0.92 | 2.73 |
| $t'_{50}$ (min) | 6.14 | 5.29 | 3.22 | 2.82 | 7.23 |
| $t'_{90}$ (min) | 20.38 | 18.34 | 20.94 | 13.55 | 28 |
| $t'_{95}$ (min) | 25.73 | 22.23 | 27.42 | 18.08 | 33.4 |
| Delta $t'_{50} - t'_{10}$ (min) | 4.85 | 4.05 | 2.68 | 2.38 | 6.1 |
| RPA Payne Effect | | | | | |
| Strain | 9.7 phr $FeCl_3$ | 4.8 phr $FeCl_3$ | 2.4 phr $FeCl_3$ | 0 phr $FeCl_3$ | Control |
| 0.28 | 2030.6 | 2837.8 | 1807.4 |  | 2442.8 |
| 0.98 | 2212.9 | 3319.8 | 2024.6 | 849.29 | 2518.6 |
| 1.95 | 2137.9 | 3158.1 | 2016.1 | 937.58 | 2459.2 |
| 4.05 | 1816.5 | 2465.5 | 1736.6 | 950.73 | 2110.8 |
| 7.95 | 1360.9 | 1643.4 | 1302 | 881.04 | 1574.8 |
| 16.04 | 877.94 | 990.26 | 859.99 | 718.01 | 1029.5 |
| 31.95 | 538.56 | 581.1 | 534.26 | 526.43 | 642.99 |
| 64.03 | 320.77 | 336.77 | 317.42 | 346.68 | 387.5 |
| 124.99 | 196.69 | 204.87 | 192.01 | 220.23 | 235.31 |
| 249.98 | 117.02 | 124.12 | 116.12 | 137.73 | 135.79 |
| 450.03 | 75.745 | 79.012 | 78.495 | 99.171 | 81.191 |

The data in Table 1 shows the effect of adding $FeCl_3.xH_2O$ and monoethanolamine to assist in the dispersion and bonding of the filler in the brominated butyl elastomer, when compared to the control compound. The ratio M300/M100 is commonly used as a relative measure of the degree of filler reinforcement in an elastomer compound (the higher the ratio the higher the reinforcement). M300/M100 for the control (no silane or $FeCl_3.xH_2O$) is 1.02 and for $FeCl_3 \cdot xH_2O$ and ethanolamine containing compounds ranges from 2.31 to 3.95. The stress-strain profile shown in FIG. 1 further emphasizes this point.

Figure 2:
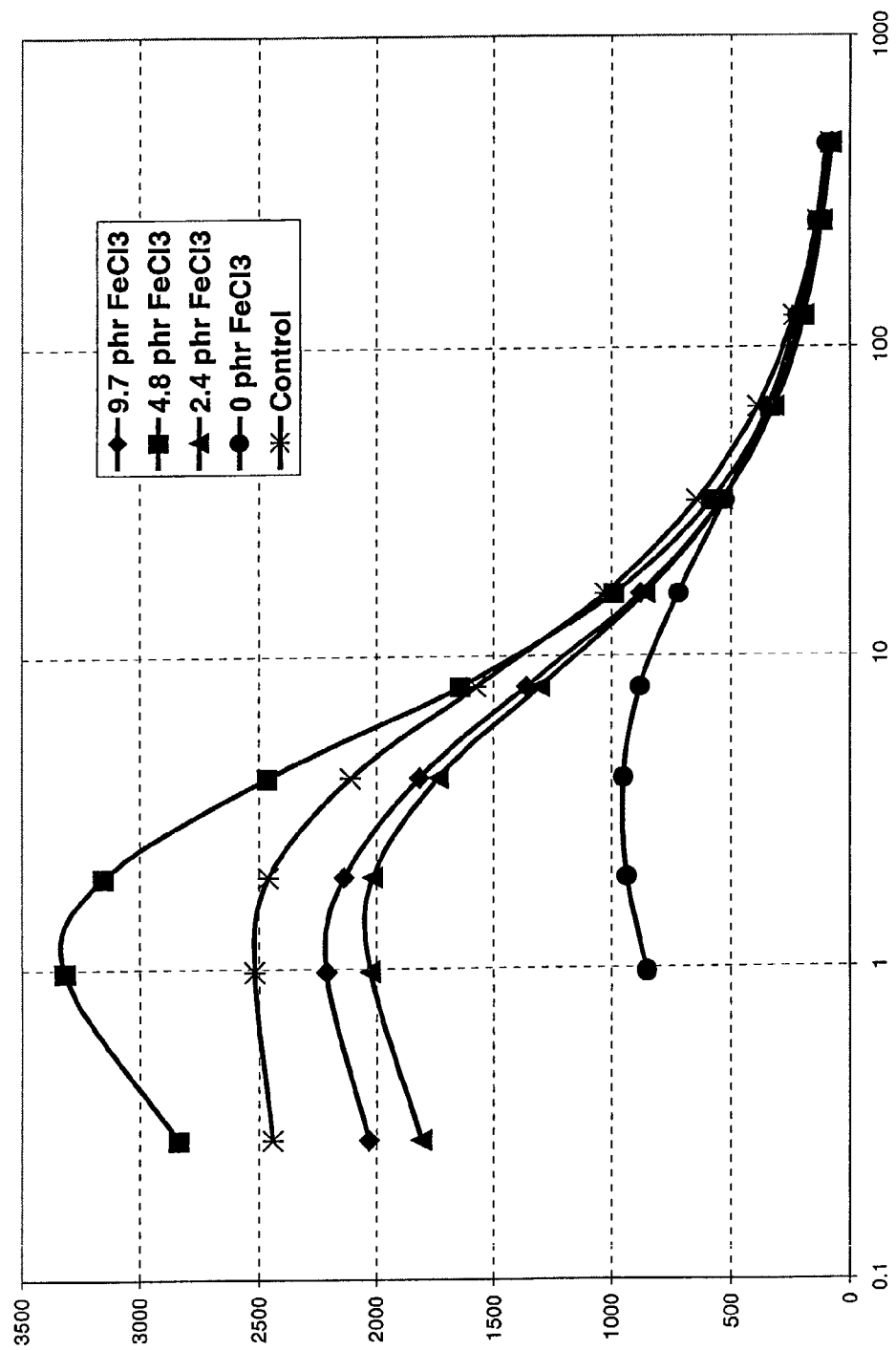
FIG. 2 illustrates the dependence of the value of the complex modulus at low strain levels on the loafing of $FeCl_3.xH_2O$.

The value of the complex modulus ($G^*$) at low strain levels is commonly taken as a measure of silica dispersion (the lower the $G^*$ value at low strains, the better the silica dispersion). FIG. 2 shows the dependence of this value on the loading of $FeCl_3 \cdot xH_2O$. Improved silica dispersion is seen for compounds that contain monoethanolamine and $FeCl_3 \cdot xH_2O$ as compared the control compound.

Examination of the DIN Abrasion test data show that the incorporation of monoethanolamine and $FeCl_3 \cdot xH_2O$ into these compounds significantly improves wear. The control compound was far to soft to be measured (TSTM).

The $t_{03}$ time obtained from a Mooney Scorch measurement is taken to be representative of the scorch safety possessed by a rubber pre-vulcanizate. As the $t_{03}$ increases, so does the processability. From the data presented in Table 1, it is clear that the incorporation of mixtures of monoethanolamine and $FeCl_3 \cdot xH_2O$ into these compounds improves the scorch safety (lowers the t03 times) when compared to the control compound or to the compound which contains only monoethanolamine. This observation illustrates the role of $FeCl_3 \cdot xH_2O$ on the scorch safety, and thus processability, of these compounds.

Example 2

The effect of $NiCl_2 \cdot xH_2O$, $CrCl_3 \cdot xH_2O$ and $CoCl_2 \cdot xH_2O$ on the degree of reinforcement (as denoted by the M300/M100 values), degree of silica dispersion, DIN abrasion resistance and scorch safety (as denoted by the $t_{03}$ times in minutes) in compounds containing brominated butyl rubber, Hi-Sil® 233, Maglite® D and ethanolamine was studied. A compound containing only brominated butyl rubber, Hi-Sil® 233, monoethanolamine and Maglite® D was used as a control. All of the compounds studied utilized a mixture of 0.5 phr of sulfur, 1.5 phr of zinc oxide and 1.0 phr of stearic acid as the curative system.

The following levels of hydrated metal halogens were studied:
(i) 0 phr (Control)
(ii) 8.5 phr $NiCl_2 \cdot xH_2O$
(iii) 9.6 phr $CrCl_3 \cdot xH_2O$
(iv) 8.6 phr $CoCl_2 \cdot xH_2O$ All compounds used 2.2 phr of ethanolamine as the organic additive containing at least one amino group and at least one hydroxyl group.

Brominated isoprene isobutylene rubber (BIIR) was mixed with the additive, 60 parts per hundred (phr) of silica filler (Hi-Sil® 233) in a Banbury internal mixer under the mixing conditions described above. Identical curative ingredients (1 phr of stearic acid, 0.5 phr of sulfur, and 1.5 phr of ZnO) were then added on a cool mill to each of the compounds. The compounds were then cured for either $t_c(90)+10$ minutes at 170° C. (for DIN Abrasion testing) or $t_{c(90)+5}$ minutes at 170° C. and tested. Table 2 gives the product compositions, and physical property data for the hydrated metal halogen containing compounds and for the control compound which contains only monoethanolamine.

The data in Table 2 shows the effect of adding a hydrated metal halogen to BIIR/Hi-Sil/monoethanolamine compounds. Importantly, significant differences are seen on varying the metal center. This would indicate, as expected, a dependence on the degree of interaction between the monoethanolamine and the metal center to the nucleophilicity of that metal center.

Figure 3:
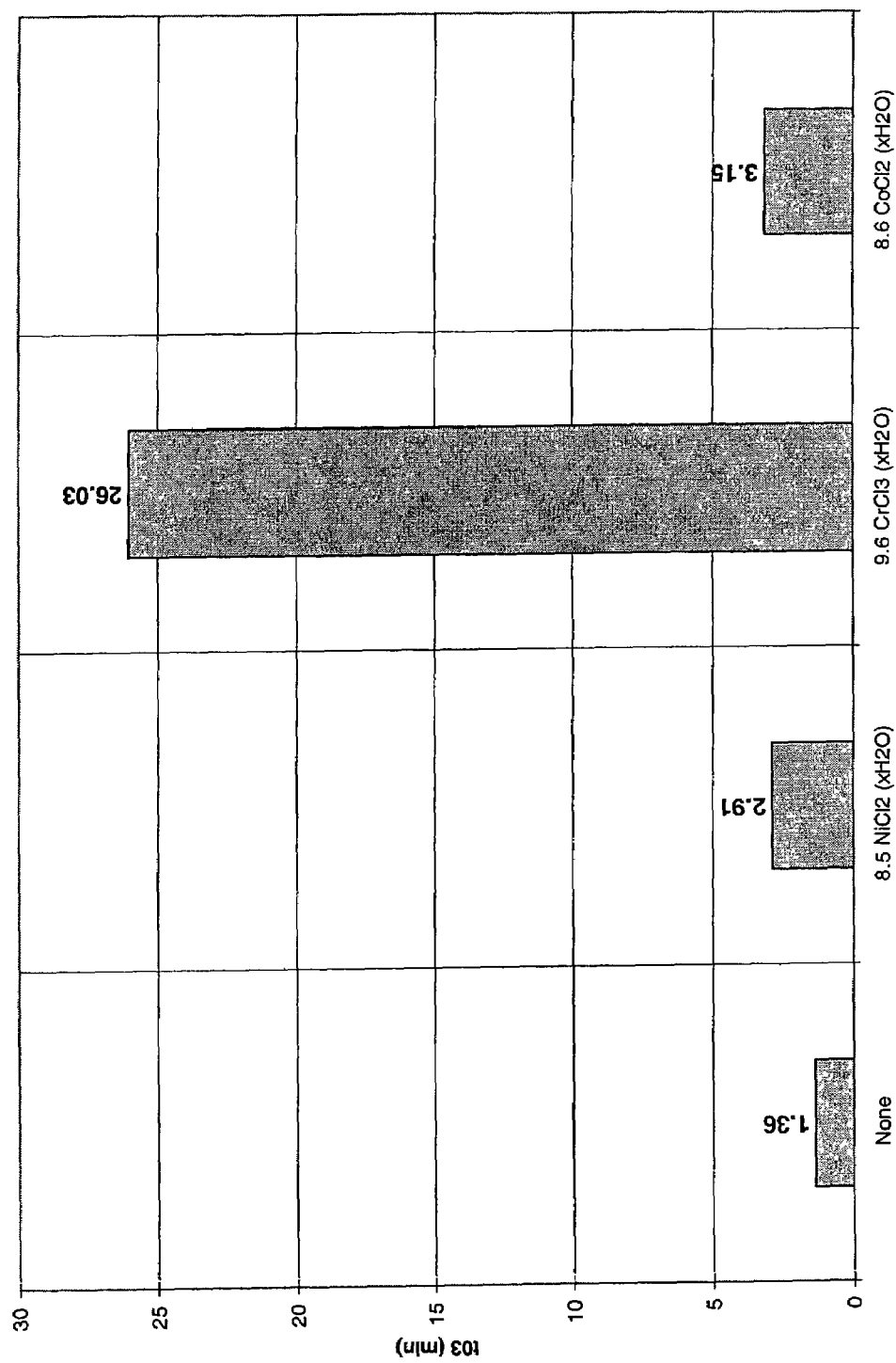
FIG. 3 illustrates the improvement in t01 times that are observed when hydrated metal halogens are incorporated into the rubber compound.

As the data in Table 2 illustrates, the interaction of the hydrated metal halogens with the monoethanolamine suppresses the function of the monoethanolamine as a dispersing and linking agent for silica within BIIR. However, it is important to note the improvements in t03 times which are observed when the hydrated metal halogens are incorporated into the rubber compound (FIG. 3).

TABLE 2

| Example | 2a | 2b | 2c | 2d |
|---|---|---|---|---|
| Coupling Agent | None | 8.5 $NiCl_2$ ($xH_2O$) | 9.6 $CrCl_3$ ($xH_2O$) | 8.6 $CoCl_2$ ($xH_2O$) |
| STRESS STRAIN (DUMBELLS) | | | | |
| Cure Time (min) | 19 | 21 | 28 | 21 |
| Cure Temperature (° C.) | 170 | 170 | 170 | 170 |
| Dumbell | Die C | Die C | Die C | Die C |
| Test Temperature (° C.) | 23 | 23 | 23 | 23 |
| Hard. Shore A2 Inst. (pts.) | 72 | 71 | 62 | 72 |
| Ultimate Tensile (MPa) | 17.53 | 13.92 | 12.15 | 13.48 |
| Ultimate Elongation (%) | 343 | 863 | 1012 | 897 |
| Strain (% Elongation) | None | 8.5 $NiCl_2$ ($xH_2O$) | 9.6 $CrCl_3$ ($xH_2O$) | 8.6 $CoCl_2$ ($xH_2O$) |
| 25 | 1.83 | 1.51 | 1.21 | 1.59 |
| 50 | 2.31 | 1.45 | 1.14 | 1.54 |
| 100 | 3.67 | 1.53 | 1.15 | 1.52 |
| 200 | 8.24 | 2.2 | 1.51 | 1.9 |
| 300 | 14.5 | 3.39 | 2.26 | 2.74 |
| | Stress (MPa) | Stress (MPa) | Stress (MPa) | Stress (MPa) |
| 300/100 | 3.95 | 2.22 | 1.97 | 1.80 |
| DIN ABRASION | | | | |
| Abrasion Volume Loss ($mm^3$) | 255 | 345 | 399 | 374 |
| COMPOUND MOONEY SCORCH | | | | |
| t Value $t_{03}$ (min) | 1.36 | 2.91 | 26.03 | 3.15 |
| MDR CURE CHARACTERISTICS | | | | |
| MH (dN · m) | 41.58 | 29.27 | 22.58 | 30.65 |
| ML (dN · m) | 14.05 | 13.67 | 13.19 | 14.34 |
| Delta MH-ML (dN · m) | 27.53 | 15.6 | 9.39 | 16.31 |
| $t_{s1}$ (min) | 0.3 | 1.62 | 2.58 | 1.2 |
| $t_{s2}$ (min) | 0.42 | 2.4 | 4.14 | 1.74 |
| $t'_{10}$ (min) | 0.44 | 2.03 | 2.5 | 1.51 |
| $t'_{25}$ (min) | 0.92 | 3.78 | 4.82 | 2.92 |
| $t'_{50}$ (min) | 2.82 | 7.13 | 11.25 | 6.14 |
| $t'_{90}$ (min) | 13.55 | 16.24 | 32.9 | 16.2 |
| $t'_{95}$ (min) | 18.08 | 18.68 | 39.24 | 18.99 |
| Delta $t'_{50} - t'_{10}$ (min) | 2.38 | 5.1 | 8.75 | 4.63 |
| RPA Payne Effect | | | | |
| Strain | None | 8.5 $NiCl_2$ ($xH_2O$) | 9.6 $CrCl_3$ ($xH_2O$) | 8.6 $CoCl_2$ ($xH_2O$) |
| 0.98 | 849.29 | 1721.4 | 1518.8 | 1967.4 |
| 1.95 | 937.58 | 1840.3 | 1770.9 | 2080.3 |
| 4.05 | 950.73 | 1554.1 | 1561.1 | 1692 |
| 7.95 | 881.04 | 1132.8 | 1148.8 | 1189 |
| 16.04 | 718.01 | 734.77 | 726.52 | 752.33 |
| 31.95 | 526.43 | 457.16 | 431.18 | 461.02 |
| 64.03 | 346.68 | 279.81 | 243.56 | 279.01 |
| 124.99 | 220.23 | 180.07 | 139.64 | 178.54 |
| 249.98 | 137.73 | 116.09 | 78.85 | 115.1 |
| 450.03 | 99.171 | 77.572 | 49.298 | 76.902 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a filled halobutyl elastomer comprising admixing a halobutyl elastomer, particles of filler, at least one amino alcohol, and one or more hydrated metal halogens, and curing the resulting filled halobutyl elastomer.

2. A process according to claim 1, wherein tke metal halogen is a metal bromide or chloride.

3. A process according to claim 1, wherein the amount of amino alcohol used results in a nitrogen level in the elastomer of from 0.1 to 5 parts per hundred parts of elastomer.

4. A process according to claim 1, wherein the metal halogen is used in an amount of from 0.1 to 10 phr.

5. A process according to claim 1, wherein the filler is silica or carbon black.

6. A process according to claim 1 wherein the filled halobutyl elastomer is admixed with another elastomer or elastomeric compound before it is subjected to curing.

7. A process according to claim 1, wherein the filled halobutyl elastomer is cured with 0.3 to 2.0 parts by weight of sulfur.

8. A filled, halobutyl elastomer composition comprising at least one halobutyl elastomer, particles of filler, at least one amino alcohol, and one or more hydrated metal halogens.

9. A filled, cured elastomer composition prepared by a process according to claim 1.

10. A filled, cured elastomer composition according to claim 9 in the form of a tread for a vehicle tire.

11. A filled, cured elastomer composition according to claim 10 in the form of an innerliner for a vehicle tire.

* * * * *